United States Patent [19]

Lloyd et al.

[11] Patent Number: 4,889,150
[45] Date of Patent: Dec. 26, 1989

[54] PRESSURE CONTROL FOR EARTHQUAKE SENSITIVE SHUT-OFF VALVE

[75] Inventors: Hershall E. Lloyd; Monte E. Lloyd, both of Los Angeles, Calif.

[73] Assignee: Safe-T-Quake Corporation, El Monte, Calif.

[21] Appl. No.: 100,549

[22] Filed: May 31, 1988

[51] Int. Cl.$^4$ .................. E16K 17/36; E16K 17/22
[52] U.S. Cl. ........................... 137/39; 137/460; 137/461
[58] Field of Search ............... 137/38, 39, 460, 461, 137/498

[56] References Cited

U.S. PATENT DOCUMENTS

| | | | |
|---|---|---|---|
| 820,598 | 5/1906 | Petersen | 137/460 |
| 2,749,926 | 6/1956 | Dillman | 137/461 X |
| 3,575,204 | 4/1971 | McMurry | 137/498 |
| 3,747,616 | 7/1973 | Lloyd | 137/38 |
| 4,120,316 | 10/1978 | Robinson | 137/498 |
| 4,278,102 | 7/1981 | Kelley | 137/39 |
| 4,715,394 | 12/1987 | O'Donnell et al. | 137/78 |

FOREIGN PATENT DOCUMENTS 891754 10/1953 Fed. Rep. of Germany ...... 137/498

Primary Examiner—Robert G. Nilson
Attorney, Agent, or Firm—William H. Maxwell

[57] ABSTRACT

A pressure control for a shut-off valve, preferably an earthquake sensitive shut-off valve, and a control for closing the valve in response to regulated pressure failure in the pressure supply of gas or the like thereto, and including a meter means or the like upstream, the control sensing pressures both upstream and downstream for its operation, for protecting downstream appliances and apparatus.

6 Claims, 1 Drawing Sheet

PRESSURE CONTROL FOR EARTHQUAKE SENSITIVE SHUT-OFF VALVE

BACKGROUND OF THE INVENTION

This invention relates to an earthquake sensitive shut-off valve or the like, and particularly to protect gas operated systems from damage caused by abnormal increases in gas pressure. Both residential and commercial building and establishments are supplied with gas, either natural gas or liquid petroleum gas. In either supply of gas there is pressure regulation which is subject to failure, as caused by catastrophic circumstances or by mechanical malfunction. Pressure regulators are involved whereby a high pressure source of gas is reduced in pressure to ¼ lbs. p.s.i. for domestic use, for example. The high pressure source of natural gas is substantially greater than the end use pressure, and would be damaging to domestic as well as commerical appliances and apparatus, if subjected thereto. For instance, liquid petroleum sources of butane and propane are stored at 160 lbs. p.s.i. which is a damaging pressure when exposed to gas operated appliances and such apparatus by failure or malfunction in the supply source. It is therefore a general object of this invention to provide a pressure responsive control that closes off the gas pressure source in the event of a substantial increase in pressure that would be damaging. In practice, this control is combined with an Earthquake Sensitive Shut-Off Valve as disclosed and claimed in U.S. Pat. No. 3,747,616 issued to Hershall E. Lloyd Jul. 24, 1973.

The earthquake sensitive valve involved herein is characterized by a valve element that is manually set for normal open operation, the valve unit involving a leveled body having a saddle upon which the valve element is normally mounted and from which it is displaceable to drop onto a seat in the flow passage through the valve. It is an object of this invention to displace the valve element from the saddle and onto the seat when pressure is suddenly and substantially increased in the supply source of gas. In practice, there is usually a meter means between the pressure regulated gas supply source and the earthquake sensitive valve that protects the building system and gas operated appliances and/or apparatus.

The usual meter means is adapted to accomodate and handle a normal flow of gas at the aforesaid pressure of ¼ lbs. p.s.i.. However, said meter means will not accomodate or properly handle flow of gas at the aforesaid pressure of 160 lbs. p.s.i., for example. If and when there is a surge of said high pressure gas, then there is a restriction to flow caused by the surge of gas through the meter means in excess of its normal capacity, and consequently a pressure differential occurs between the upstream and downstream sides of the meter means. In lieu of a meter means, a flow restrictor or orifice is employed in the gas supply source to the earthquake sensitive valve, it being an object of this invention to advantageously employ this differential in pressure, as will be described.

The valve element of the valve as it is disclosed herein is a ball that is adapted to be repositioned upon the saddle by a push pin or the like. And, it is an object of this invention to displace the ball by means of a separate pressure actuated push pin. In practice, the pressure actuated push pin is operated by the aforesaid upstream higher pressure when a surge occurs in the gas pressure supply source, as caused by malfunction due to catastrophic circumstances or mechanical failure.

SUMMARY OF THE INVENTION

This pressure control is responsive to abnormally high pressure that will occur in a pressure regulated gas supply source, either a natural or liquid petroleum source. Gas supplies are most often metered, and earthquake sensitive valves are installed downstream of the meter or a flow controlling orifice. In the event of a malfunction in the gas supply source causing abnormally high pressure to reach the meter, or orifice, there is a restriction to flow which causes a differential in pressure which is used here to operate the pressure sensitive control so as to shut off the gas supply source at the earthquake sensitive shut-off valve. It will be understood that pressure regulator malfunction can occur independently of an earthquake temblor. The control herein disclosed is characterized by a cylinder and piston means or the like in open communication with the upstream pressure and responsive thereto to actuate a plunger or pin that displaces the valve element or ball from the saddle mount so as to fall by gravity onto the valve seat, thereby positively precluding gas flow into the building system and appliances or apparatus that could be damaged thereby.

The foregoing and various other objects and features of this invention will be apparent and fully understood from the following detailed description of the typical preferred forms and applications thereof, throughout which description reference is made to the accompanying drawings.

THE DRAWINGS

Figure 4:
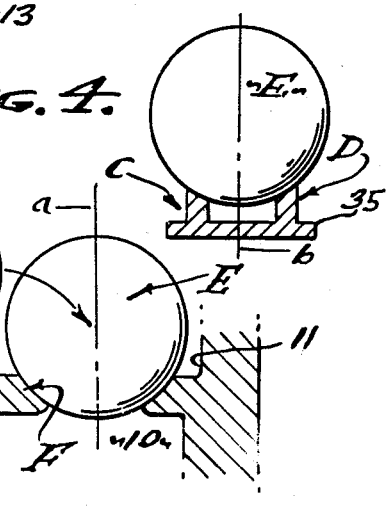

And, FIG. 4 is a cross sectional view showing the mounted condition of the valve element.

PREFERRED EMBODIMENT

The pressure control and earthquake sensitive shut-off valve are incorporated in the plumbing that handles a gas supply source which is to be isolated from building systems and appliances in the event of earthquakes and pressure regulation malfunctions and the like. The earthquake sensitive shut-off valve V is a piece of hardware that is permanent in nature and which is installed in a service pipe line to pass gas under normal conditions and to stop the flow of said gas in the event of an earthquake or a pressure regulation malfunction. Earthquakes are evaluated according to intensity and the magnitude thereof is comparable with a number on the Richter scale; and therefore the pitch of an inclined bar C and the complementary configuration of its saddle D hereinafter described are determined by the magnitude of shock or vibration required to demount the valve element E that is cooperatively associated therewith. Pressure regulation is provided in the gas supply source as by means of a pressure regulator means R that opens into a gas main G. The gas source, not shown, can be natural gas or liquid petroleum gas, either of which is pressure regulated and subject to malfunctions that will result in damaging pressure surges. As shown, a meter means M is connected into the gas main G and from which a service pipe S extends downstream to the building system and gas appliances and apparatus to be protected. The earthquake sensitive shut-off valve V is installed immediately downstream of the meter means M; or alternately immediately downstream of a flow restricting orifice or the like.

The valve body A is characterized by its vertical disposition on axis a and by a flow passage 10 extending therethrough along said axis. As shown, the body A is cylindrical with an inner diameter wall 11 extending between coupling means 12 and 13 at the top and bottom ends thereof. In the case of plumbing with pipe, the coupling means 12 and 13 are tapered pipe threads receiving the terminal complementary end portions of two vertically disposed sections of service pipe for downward flow therethrough. A feature of the body A is the seat F that is provided therein to receive the valve element E for stopping flow through the valve, the seat F comprising an upwardly faced annular shoulder located at the lower end of the body A immediately above the coupling means 13. In practice, the seat F is angularly disposed for tangential engagement with the curvature of the valve element E so as to have annular interface engagement therewith.

The housing B is preferably an integral part of the body A and provides a laterally disposed chamber 15 open into the flow passage 10 and configured to accommodate the valve element E mounted upon the saddle D of inclined bar C. The body B is a laterally open chamber 15 closed by a removeable cap 16 providing access to the valve element E and for exchanging inclined bars C which may be selected as required by Richter scale values. The housing B is a horizontally disposed tubular extension of body A with the cap 16 secured over its open outer end by means of screw threads.

The inclined bar C and its saddle D are positioned in chamber 15 to mount the valve element E out of alignment with flow passage 10. In practice, the element E is mounted entirely within the confines of housing B and out of said flow passage. In accordance with this invention, the valve element E is spherical and of a diameter free to pass within the inner diameter wall 11 of the passage 10; and also free within the confines of housing B. That is, the spherical ball-shaped valve element E is movably unrestricted and is detachable from the body and housing structure, being guided therein along axis a by close conformity to the inner diameter wall 11.

The valve element E is made of a heavy metal so as to engage firmly upon the seat F and to be subjected to the force of pressure exerted by the gas pressure supply source to be stopped thereby. Thus, the valve element E will fall into said engagement upon the seat F and thereby stop the gas flow downwardly through the valve V.

The inclined bar C is disposed so as to roll the valve element E toward the axis a. Accordingly, the body A and housing B must be suitably leveled, and to this end a level means L is provided to indicate the vertical disposition of axis a and corresponding inclination of bar C. In the preferred form, a spirit level 20 is fixed into the valve unit overlying the housing B, wherein a bubble is visible to be centered for erecting the valve as a unit.

Inclined bar C is preferably a pair of rails that extend upwardly and away from axis a at an acute angle of inclination, and such as to ensure rolling of the valve element E toward the terminal inner end of the bar for mounting upon the saddle D. As shown, the rails of bar C are reversely inclined to form the saddle D which normally retains the valve element E in the housing B. As shown, the saddle rails are upturned at 22 at an acute angle complementary to the inclination of bar C. It will be observed that the lateral placement of the interface support engagement of the valve element E upon the saddle support places its radial symmetry about the vertical center line b extending perpendicularly through the sphericl valve element E; and it is through this supporting symmetry that a predetermined amplitude of vibration in the form of lateral accelerations or decelerations is employed with predetermined accuracy to demount the valve element E.

The inclined bar is a replaceably exchangeable part fabricated separately from the valve body, and carried in the chamber 15 by guides 35 provided to capture the bar in working position. As shown, the inclined bar C and its associated saddle D are integrally formed as by casting or the like.

A means H is provided to withdraw the valve element E from its demounted engagement upon the seat F, means H being shown as a removable push pin 50 entering through an opening 18 in the body wall 11 of the valve. The push pin 50 slideably enters the chamber 15 through a gland 51 established by a screw-on fitting of cage 52 that protectively surrounds the push pin at the exterior of the body wall 11. The push pin 50 is normally retracted from the valve element E by a spring 53, and it is manually operable to remount the valve element by means of a manually engageable slide 54 that is operable through a side slot 55 in the wall of the cage 52. In practice, the slide 54 is in the form of a cross pin slideable in diametrically opposite slots 55 of the cage 52, the cage being closed by a plug 56 to capture the push pin 50, and so as to establish a reset unit attached to the body of the valve.

It will seen that the single moving part of the earthquake sensitive shut-off valve V involves a spherical ball-shaped element E which is normally supported within the lateral housing B and removed from the flow of gas through passage 10. The spherical element E can be displaced or demounted inwardly off of the inner end of the inclined bar C and its saddle D, or to either side thereof, or it can be pushed off or demounted from the saddle D by the pressure control means P as will now be described.

Figure 1:
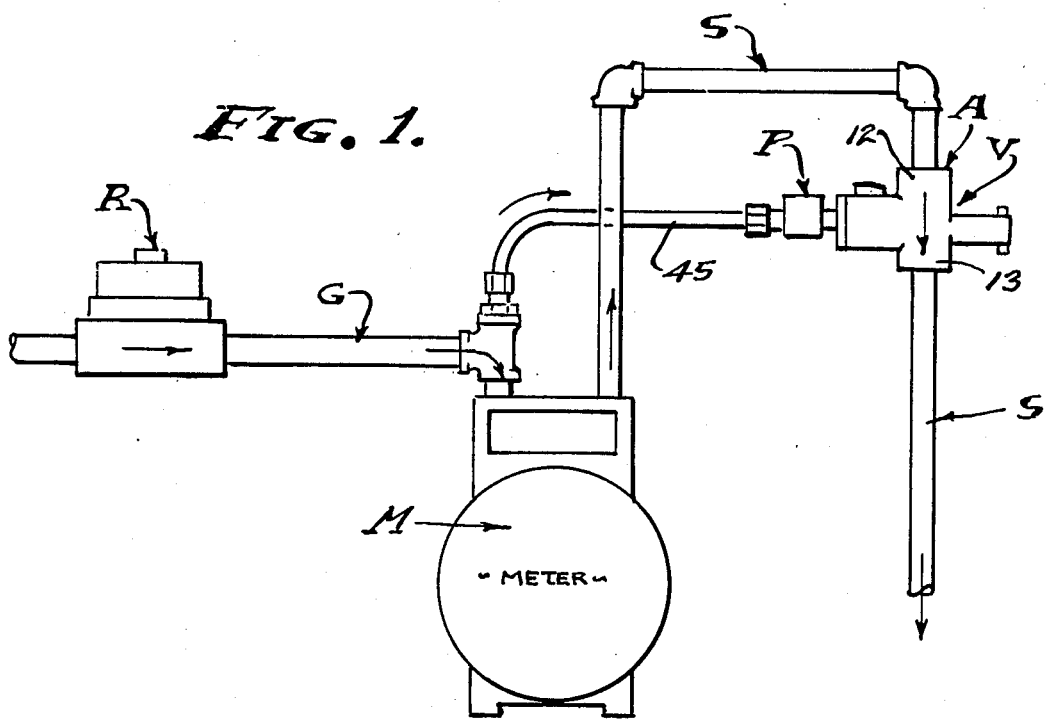
FIG. 1 shows a typical installation of the pressure control and earthquake sensitive shut-off valve of the present invention.
Figure 2:
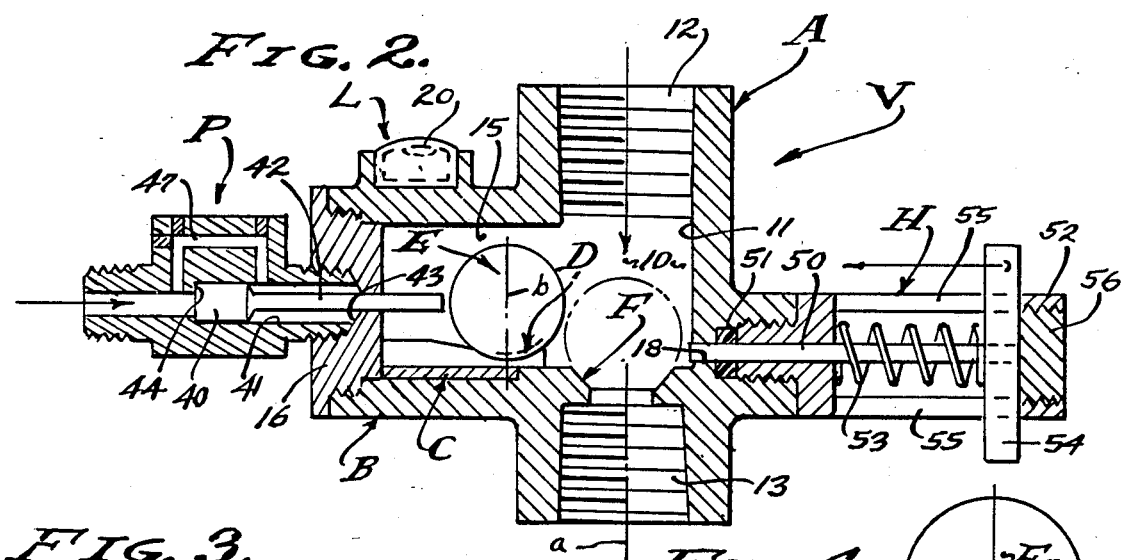
FIG. 2 is an enlarged sectional view of the pressure control and earthquake sensitive shut-off valve, shown in normal operating condition.
Figure 3:
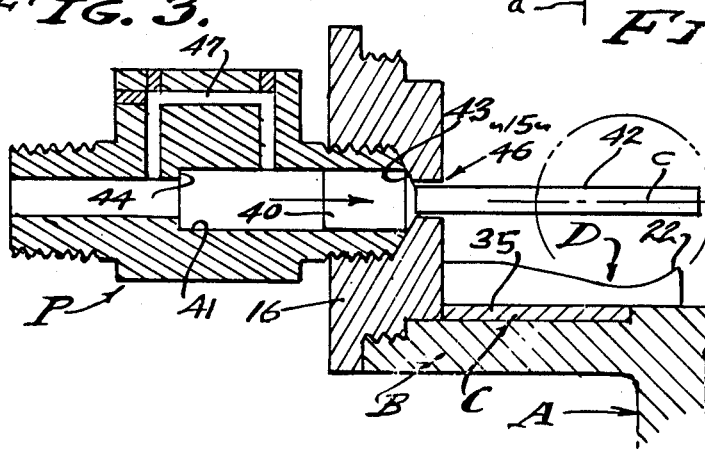
FIG. 3 is an enlarged detailed fragmentary sectional view showing operation of the pressure control, and closure of the shut-off valve.

In accordance with this invention, we provide the pressure control means P that demounts the valve element E in the event of a pressure regulation failure in the gas supply source. The means P is combined herein with the earthquake sensitive shut-off valve V, although it is to be understood that valve shut-off means other than that disclosed herein can be employed in combination with this pressure control means P, it being a primary object of this invention to protect downstream appliances and apparatus from any abnormally high gas pressures. As shown throughout the drawings, the pressure control means P is a pressure responsive means operable to close the shut-off valve V, and in the preferred form to demount the valve element E so that it falls onto the valve seat F. In practice, the pressure responsive means is a cylinder and piston means, or the like such as for example a diaphragm means, that is in open communication with the gas supply source G. In carrying out this invention the cylinder and piston means is open into the main G upstream of the meter means M, or the aforementioned alternate flow restriction. Accordingly, a low level regulated gas pressure occurs in the main G and within chamber 15 of valve V under normal conditions. However, in the event of a pressure surge through main G the upstream pressure in main G will be greater than the downstream pressure in chamber 15, establishing a pressure differential that operates the pressure control means P. The pressure control means P is shown embodied in an attachment to the earthquake sensitive shut-off valve V, carried by the cap 16 that closes chamber 15. The spherical ball valve element E is centered, in its mounted position, upon a horizontal axis c on which a piston 40 reciprocates freely in a cylinder 41. The piston 40 carries a push pin or plunger 42 that enters the chamber 15 through a valve seat 43 that will close the inner end of the cylinder 41 when the piston 40 is shifted forwardly as shown in FIG. 3. Also, the cylinder 40 has an outer end wall 44 that stops the piston 40 when shifted rearwardly as shown in FIG. 2 so as to positionably retract the plunger 42. The normal operating condition of the shut-off valve V is shown in FIG. 2, with the piston 40 and plunger 42 retracted and with the valve element E mounted on the saddle D coincidental with the axis b. The shut-off condition is shown in FIG. 3 with the piston 40 and plunger 42 protracted and with the valve element E demounted and seated upon the valve seat F.

A feature of this invention is the open communication at the outer end of cylinder 41 into the upstream portion of the gas supply main G. As shown, this comunication is through a pipe or tubing 45 coupled into main G ahead of the meter M, or alternate flow restriction. Another feature of this invention is the open communication of the inner valve seat (43) end of the cylinder 41 into the valve chamber 15. As shown, the opening 46 for the plunger 42 into the chamber 15 is loose with some clearance, so that chamber 15 pressure is communicated into the cylinder 41 when the piston is retracted (see FIG. 2). However, another feature is that flow of gas through opening 46 is closed by the piston 40 engaged upon valve seat 43 when the piston if protracted (see FIG. 3).

In accordance with this invention, a by-pass 47 embraces the piston 40 when it is retracted as shown in FIG. 2, whereby pressure is in equilibrium at the front and back of the piston. Therefore, when the piston is subjected to normal operating conditions, the same low level gas pressure, for example ⅛ lbs. p.s.i., occurs upstream in main G and as well in the chamber 15 that opens into the service line S, in which case the piston 40 and plunger 42 remain inoperative. However, when a high level gas pressure surge occurs in the upstream main G, for example 160 lbs. p.s.i., there is established a differential in pressure through the meter means M, or alternate flow restriction, in which case the piston 40 and plunger 42 are operated and/or actuated to demount the valve element E, and so as to close the piston 40 with the valve seat 43. Thus, the shut-off valve V is closed and the chamber 15 thereof islolated from the high pressure gas source existant in the main G because of malfunction. In the event that the pressure regulation failure or malfunction is gradual, the cylinder and piston means is effective due to the smaller diameter of plunger 42 compared with the larger diameter of piston 40, thereby establishing a differential effect that operates the piston 40 and plunger 42 when the by-pass 47 is closed by initial forward movement of the piston 40.

The fit of plunger 42 in opening 46 is sufficiently close to establish the plunger 42 as a ram or piston when subjected to upstream pressure applied through tubing 45, so as to cause said initial forward movement.

Having described only the typical preferred forms and applications of our invention, we do not wish to be limited or restricted to the specific details herein set forth, but wish to reserve to ourselves any modifications or variations that may appear to those skilled in the art, as set forth within the limits of the following claims.

We claim:

1. A normally open shut-off valve closed by increased upstream pressure in a main thereto so as to protect a downstream service line therefrom, and including; a pressure sensitive means wherein upstream pressure in the main is sensed ahead of a flow restriction in the main and downstream pressure is sensed following said flow restriction and operable to close the shut-off valve in response to upstream pressure greater than downstream pressure and comprised of a cylinder and piston means with a by-pass between the front and back of the piston and open to downstream pressure when the piston is retracted in the normal open condition of the shut-off valve, the by-pass being in open communication with upstream pressure, and the piston having a reduced diameter plunger for differential operation through a loose fitting opening exposed to pressure downstream of the shut-off valve and closed against a seat when subjected to high upstream pressure.

2. The shut-off valve and pressure sensitive means operable to close the same as set forth in claim 1, wherein the cylinder of the cylinder and piston means has a stop wall for a retracted position of the piston and a valve seat for a protracted position of the piston to close against said valve seat when subjected to high upstream pressure.

3. A normally open pressure controlled and earthquake sensitive shut-off valve closed in response to temblor movements and in response to increased upstream pressure in a main thereto so as to protect a downstream service line therefrom, and including;

a body having a downward flow passage therethrough and extending through an upwardly faced valve seat disposed on a vertical axis, a housing adjacent to the body and having a closed chamber opening into the flow passage above said seat, a spherical valve element, and a saddle to mount the valve element removed from the flow passage and demountable therefrom by temblor movements to fall into annular interengagement upon said valve seat to close the flow passage against downward flow, and pressure sensitive means operable to demount the valve element in response to upstream pressure sensed ahead of a flow restriction in the main greater than downstream pressure sensed following said flow restriction.

4. The earthquake sensitive shut-off valve and pressure sensitive means operable to close the same as set forth in claim 3, wherein the flow restriction in the main is a flow meter means.

5. A normally open pressure controlled and earthquake sensitive shut-off valve operable to close in response to temblor movements and in response to increased upstream pressure in a main thereto so as to protect a downstream service line therefrom, and including;

a body having a downward flow passage therethrough and extending through an upwardly faced valve seat disposed on a vertical axis, a housing adjacent to the body and having a closed chamber opening into the flow passage above said seat, a spherical valve element, and a saddle to mount the valve element removed from the flow passage and demountable therefrom by temblor movements to fall into annular interengagement upon said valve seat to close the flow passage against downward flow, and pressure sensitive means wherein upstream pressure in the main is sensed ahead of a flow restriction in the main and downstream pressure is sensed following said flow restriction and operable to demount the valve element in response to upstream pressure greater than downstream pressure and comprised of a cylinder and piston means, with a by-pass between the front and back of the piston and open to downstream pressure when the piston is retracted in the cylinder and when the valve element is mounted on the saddle, the by-pass being in open communication with upstream pressure, and the piston having a reduced diameter plunger exposed to pressure downstream of the shut-off valve for differential operation of the piston and plunger to demount the valve element from the saddle when subjected to high upstream pressure.

6. The earthquake sensitive shut-off valve and pressure sensitive means operable to close the same as set forth in claim 5, wherein the cylinder of the cylinder and piston means has a stop wall for a retracted position of the piston and a valve seat for a protracted position of the piston.

* * * * *